United States Patent
Muroi

(10) Patent No.: US 10,629,863 B2
(45) Date of Patent: Apr. 21, 2020

(54) PACKAGING MATERIAL FOR POWER STORAGE DEVICE AND POWER STORAGE DEVICE USING THE PACKAGING MATERIAL

(71) Applicant: TOPPAN PRINTING CO., LTD., Tokyo (JP)

(72) Inventor: Yuki Muroi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 36 days.

(21) Appl. No.: 15/805,221

(22) Filed: Nov. 7, 2017

(65) Prior Publication Data

US 2018/0108880 A1 Apr. 19, 2018

Related U.S. Application Data

(63) Continuation of application No. PCT/JP2016/063427, filed on Apr. 28, 2016.

(30) Foreign Application Priority Data

May 14, 2015 (JP) .................................. 2015-098831

(51) Int. Cl.
  *H01M 2/02* (2006.01)
  *H01G 11/78* (2013.01)
  (Continued)

(52) U.S. Cl.
  CPC .............. *H01M 2/028* (2013.01); *B32B 1/00* (2013.01); *B32B 3/30* (2013.01); *B32B 7/12* (2013.01);
  (Continued)

(58) Field of Classification Search
  CPC ...... H01M 2/028; H01M 2/02; H01M 2/0285; H01M 2/0287; H01M 2/1094; H01M 2/30
  See application file for complete search history.

(56) References Cited

U.S. PATENT DOCUMENTS

2006/0093906 A1* 5/2006 Yamashita .............. B32B 15/08
                                                                429/176
2008/0050652 A1* 2/2008 Hirose ................ H01M 2/0275
                                                                429/200

(Continued)

FOREIGN PATENT DOCUMENTS

| CN | 101118961 A | 2/2008 |
| CN | 103518272 A | 1/2014 |

(Continued)

OTHER PUBLICATIONS

International Search report issued in International Patent Application No. PCT/JP2016/063427 dated Aug. 2, 2016.

(Continued)

*Primary Examiner* — Jimmy Vo
(74) *Attorney, Agent, or Firm* — Foley & Lardner LLP

(57) ABSTRACT

The present invention relates to a packaging material for a power storage device including at least a substrate layer, an adhesive layer, a metal foil layer, an anti-corrosion treatment layer, an adhesive resin layer and a thermal bonding resin layer laminated in this order, wherein a thickness of the adhesive layer is in a range of 0.3 to 3 μm, a 10-point average roughness Rzjis (in accordance with JIS B0601) of a surface of the metal foil layer which faces the substrate layer is in a range of 0.3 to 3 μm, and the thickness of the adhesive layer is not less than the 10-point average roughness Rzjis and not more than 3 μm, and a peel strength between the substrate layer and the metal foil layer (in (Continued)

accordance with JIS K6854-3) is in a range of 5 to 12 N/15 mm.

8 Claims, 4 Drawing Sheets

(51) Int. Cl.
    *B32B 15/08*      (2006.01)
    *B32B 25/08*      (2006.01)
    *B32B 15/088*      (2006.01)
    *B32B 7/12*      (2006.01)
    *B32B 27/16*      (2006.01)
    *B32B 27/34*      (2006.01)
    *B32B 3/30*      (2006.01)
    *B32B 15/09*      (2006.01)
    *B32B 27/36*      (2006.01)
    *B32B 25/16*      (2006.01)
    *B32B 1/00*      (2006.01)
    *B32B 27/08*      (2006.01)
    *B32B 27/32*      (2006.01)
    *H01G 4/005*      (2006.01)
    *H01G 4/224*      (2006.01)
    *H01G 4/228*      (2006.01)
    *H01M 2/10*      (2006.01)
    *H01M 2/30*      (2006.01)

(52) U.S. Cl.
    CPC ............ *B32B 15/08* (2013.01); *B32B 15/088* (2013.01); *B32B 15/09* (2013.01); *B32B 25/08* (2013.01); *B32B 25/16* (2013.01); *B32B 27/08* (2013.01); *B32B 27/16* (2013.01); *B32B 27/32* (2013.01); *B32B 27/34* (2013.01); *B32B 27/36* (2013.01); *H01G 4/005* (2013.01); *H01G 4/224* (2013.01); *H01G 4/228* (2013.01); *H01G 11/78* (2013.01); *H01M 2/02* (2013.01); *H01M 2/0285* (2013.01); *H01M 2/0287* (2013.01); *H01M 2/1094* (2013.01); *H01M 2/30* (2013.01); *B32B 2255/06* (2013.01); *B32B 2255/10* (2013.01); *B32B 2255/20* (2013.01); *B32B 2255/26* (2013.01); *B32B 2255/28* (2013.01); *B32B 2274/00* (2013.01); *B32B 2307/50* (2013.01); *B32B 2307/538* (2013.01); *B32B 2307/738* (2013.01); *B32B 2307/752* (2013.01); *B32B 2457/00* (2013.01); *B32B 2553/00* (2013.01); *H01M 2220/20* (2013.01); *H01M 2220/30* (2013.01); *Y02E 60/13* (2013.01)

(56) References Cited

U.S. PATENT DOCUMENTS

2014/0072864 A1*    3/2014    Suzuta .................... B32B 15/08
                                                                                                     429/176
2015/0104698 A1*    4/2015    Fung .................... H01M 2/0285
                                                                                                     429/175

FOREIGN PATENT DOCUMENTS

| JP | 2002-075297 | 3/2002 |
| JP | 3567230 | 9/2004 |
| JP | 2012-238455 A | 12/2012 |
| JP | 2013-006412 | 1/2013 |
| JP | 2015-088415 | 5/2015 |
| TW | 201515305 A | 4/2015 |
| WO | WO-2013/069698 | 5/2013 |
| WO | WO-2015/045887 | 4/2015 |

OTHER PUBLICATIONS

Chinese Office Action dated Nov. 26, 2019 for corresponding Application No. 201610313174.2.

* cited by examiner

PACKAGING MATERIAL FOR POWER STORAGE DEVICE AND POWER STORAGE DEVICE USING THE PACKAGING MATERIAL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/063427, filed on Apr. 28, 2016, which is based upon and claims the benefit of priority of Japanese Patent Application No. 2015-098831, filed on May 14, 2015, the entireties of which are hereby incorporated by reference.

TECHNICAL FIELD

The present invention relates to a packaging material for a power storage device and to a power storage device using the packaging material.

BACKGROUND

In recent years, ultra-thin and compact power storage devices have been actively developed for use in personal computers, mobile terminal devices such as cell phones, video cameras, satellites and vehicles. As a packaging material for such power storage devices, laminate packaging materials formed of a multi-layered film (for example, a configuration made up of a substrate layer/first adhesive layer/metal foil layer/second adhesive layer/thermal bonding resin layer) have been attracting attention. Unlike metal cans that have been used as a container, the laminate packaging materials formed of a multi-layered film are superior to the metal cans in light weight, high heat radiation and freedom of design.

The power storage device is produced, for example, by forming a recess by cold molding on part of the packaging material for the power storage device formed of a multi-layered film, accommodating a positive electrode, a separator, a negative electrode, an electrolyte solution, and the like in the recess, folding over the remaining portion of the packaging material to cover the recess, and sealing the edges of the packaging material by thermal bonding. In recent years, for the purpose of efficiently accommodating more contents to increase the energy density, power storage devices having recesses on both sides of the packaging material to be bonded together have been produced. However, as the recess depth increases, pinholes and breakage may often occur during a molding process by a mold at an edge or corner of the recess, which is a portion having a high degree of stretching.

In order to solve the above problem, an attempt has been made to reduce the occurrence of pinholes and breakage by using a film of biaxially stretched polyamide or the like as a substrate layer of a packaging material for a power storage device to protect a metal foil (see for example PTL 1).

CITATION LIST

Patent Literature

PTL 1: JP-3567230 B

SUMMARY OF THE INVENTION

Technical Problem

However, there are still cases where occurrence of pinholes or breakage or peeling of the substrate layer from the metal foil layer during mold processing is found despite the use of the technique described in PTL 1.

In light of the above problem, an object of the present invention is to provide a packaging material for a power storage device having sufficient formability to further prevent decrease in protection effect of the substrate layer. Another object of the present invention is to provide a power storage device using the packaging material.

Solution to Problem

A packaging material for a power storage device according to the present invention includes at least a substrate layer, an adhesive layer, a metal foil layer, an anti-corrosion treatment layer, an adhesive resin layer and a thermal bonding resin layer laminated in this order, wherein a thickness of the adhesive layer is in a range of 0.3 to 3 μm, a 10-point average roughness Rzjis (in accordance with JIS B0601) of a surface of the metal foil layer which faces the substrate layer is in a range of 0.3 to 3 μm, and the thickness of the adhesive layer is not less than the 10-point average roughness Rzjis and not more than 3 μm, and a peel strength between the substrate layer and the metal foil layer (in accordance with JIS K6854-3) is in a range of 5 to 12 N/15 mm.

Because this packaging material has a sufficient formability, it can prevent decrease in protection effect of the substrate layer. The protection effect of the substrate layer described herein is an effect of preventing occurrence of pinhole or breakage in the metal foil layer during mold processing, and high formability is required to ensure the protection effect. The inventors assume that a thick adhesive layer may disturb a pinhole prevention effect of the substrate layer and decrease formability, while a thin adhesive layer may cause breakage of the layer and decrease formability.

In the present invention, the ratio of the thickness X of the substrate layer to the thickness Y of the adhesive layer, X/Y, is preferably in the range between 4 and 50. Accordingly, the protection effect of the substrate layer and the formability are improved.

In the present invention, the adhesive layer is preferably made of a two-part curable urethane-based adhesive in which a base resin including polyol is configured to react with a hardener including bifunctional or higher functional aromatic or aliphatic isocyanate. Here, the equivalence ratio of an isocyanate group of the hardener to a hydroxyl group of the base resin ([NCO]/[OH]) is preferably in a range between 1 and 50. Accordingly, the conformity of the adhesive layer during mold processing is further improved.

In the present invention, the substrate layer preferably includes at least one of a polyamide film and a polyester film. Accordingly, the protection effect of the substrate layer and the formability are improved.

In the present invention, the substrate layer preferably includes the polyamide film and the polyester film laminated via a second adhesive layer, the second adhesive layer is preferably made of the same adhesive as the adhesive layer, and the thickness of the second adhesive layer is preferably in a range of 0.3 to 3 µm. Accordingly, the protection effect of the substrate layer and the formability are improved.

In the present invention, a corona treatment, frame treatment, primer treatment or ultraviolet radiation treatment is preferably performed on the surface of the substrate layer which faces the metal foil layer. Accordingly, the conforming effect of the adhesive layer is improved.

In the present invention, a second anti-corrosion treatment layer is preferably further disposed between the adhesive layer and the metal foil layer. Accordingly, the conforming effect of the adhesive layer is improved.

A power storage device according to the present invention includes a power storage device element which includes a positive electrode and a negative electrode; a metal terminal connected to each of the positive electrode and the negative electrode; and a packaging material having a mold section with a depth of 6 mm or more that accommodates the power storage device element, wherein the packaging material is the packaging material for a power storage device according to the present invention, and the packaging material is folded over with the thermal bonding resin layer facing inward and end portions of the packaging material are thermally press-bonded to seal the power storage device element and hold the metal terminal to be partially exposed outside. The power storage device using the packaging material for a power storage device according to the present invention has the substrate layer sufficiently functioning as a protective layer and exhibits high electrolyte solution resistance and the like. Further, since the device efficiently accommodates more contents, the energy density can be increased.

Advantageous Effects of Invention

The present invention can provide a packaging material for a power storage device having a sufficient formability to better prevent decrease in protection effect of the substrate layer. Further, the present invention can provide a power storage device using the packaging material. With the power storage device using the packaging material for a power storage device according to the present invention, more contents can be efficiently accommodated to increase the energy density.

DETAILED DESCRIPTION

Hereinafter, an example of an embodiment of a packaging material for a power storage device according to the present invention (hereinafter, referred to as a "packaging material 1") and an example of an embodiment of a power storage device using the packaging material (hereinafter, referred to as a "power storage device 2") will be described in detail. It will be understood that the present invention is not necessarily limited to the embodiments described herein. The embodiments described herein are representative of the present invention.

Figure 1:
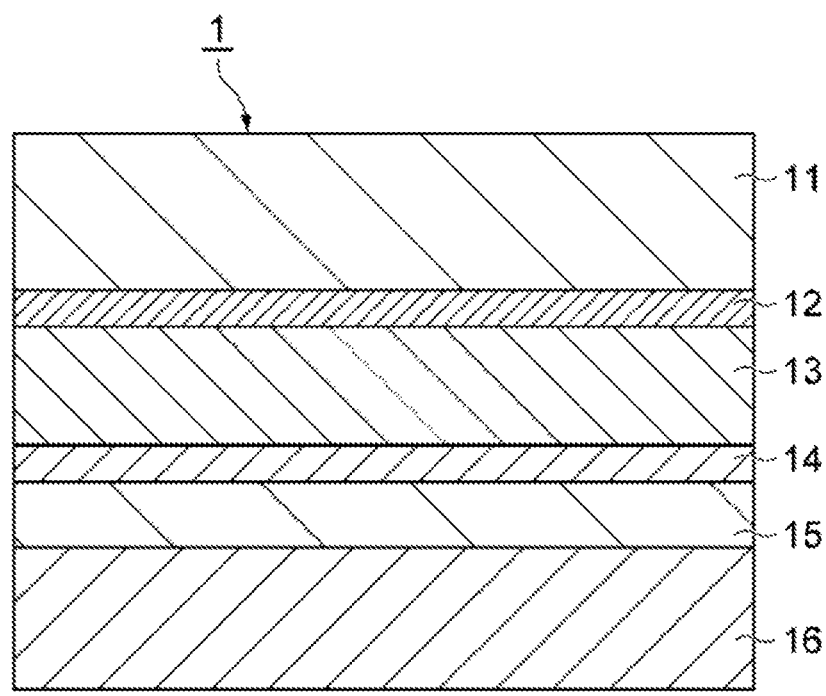
FIG. 1 is a cross-sectional view of a packaging material for a power storage device according to an embodiment of the present application.

As shown in FIG. 1, the packaging material 1 of the present embodiment has a laminate structure made up of at least a substrate layer 11, an adhesive layer 12, a metal foil layer 13, an anti-corrosion treatment layer 14, an adhesive resin layer 15 and a thermal bonding resin layer 16, which are laminated in this order.

(Substrate Layer 11)

The substrate layer 11 serves to impart heat resistance in a sealing process during production of a power storage device and prevent pinholes from occurring during processing or distribution. Further, it also serves to prevent breakage of the metal foil layer 13 during mold processing and insulate the metal foil layer 13 from other metals.

Examples of the substrate layer 11 include stretched or unstretched films of polyester resin, polyamide resin, polyolefin resin or the like. Among others, biaxially stretched polyamide film and biaxially stretched polyester film are preferred in view of improvement in formability, heat resistance, puncture resistance and insulation.

The substrate layer 11 may be a single film formed of one film or a composite film formed of two or more films bonded together via a dry laminate adhesive.

For the substrate layer 11 formed of a single film, a single layered single film such as a biaxially stretched polyamide film or biaxially stretched polyester film, or a multi-layered single film such as a biaxially stretched co-extruded film of polyamide/polyester thermoplastic elastomer/polyester can be used. Further, for the substrate layer 11 formed of a composite film, a multi-layered composite film formed of two films bonded together via a dry laminate adhesive such as a biaxially stretched polyamide film/polyurethane-based adhesive/biaxially stretched polyester film can be used.

Figure 3:
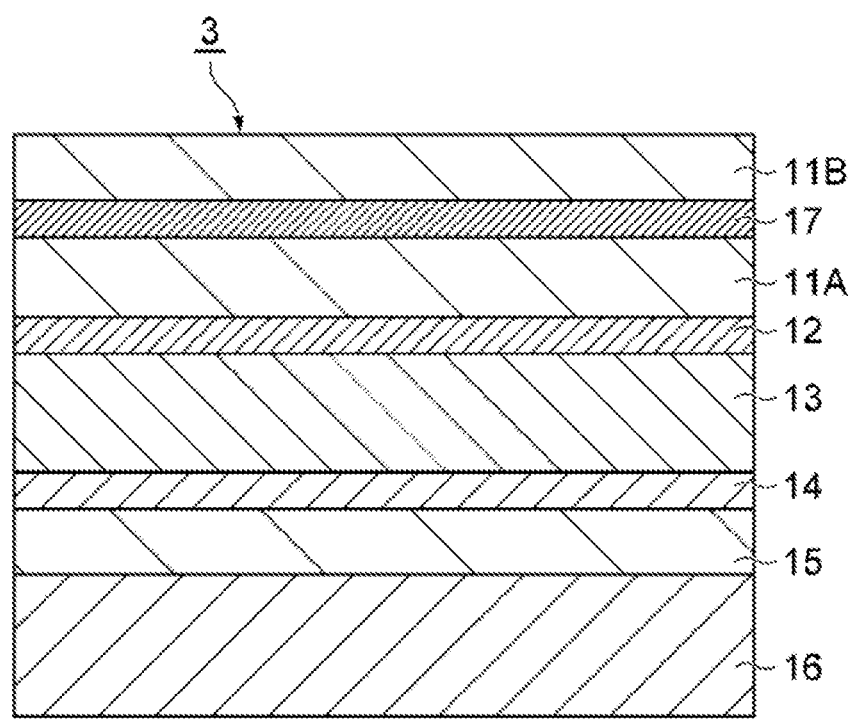
FIG. 3 is a cross-sectional view of a packaging material for a power storage device according to another embodiment of the present application.

As shown in FIG. 3, the substrate layer 11 formed of a composite film may have a configuration in which a substrate film 11A (for example, polyamide film) and a substrate film 11B (for example, polyester film) are laminated via a second adhesive layer 17. The second adhesive layer 17 is preferably made of the same adhesive as the adhesive layer 12, which will be described later. Further, the second adhesive layer 17 preferably has a thickness in the range of 0.3 to 3 µm, and more preferably in the range of 0.5 to 2 µm. The second adhesive layer having such a configuration can improve molding processability of the composite film and prevent peeling of the films which are laminated during mold processing.

Preferably, corona treatment, frame treatment, primer treatment or ultraviolet radiation treatment is applied on the surface of the substrate layer 11 which faces the metal foil layer 13. By applying the above treatment, the surface of the substrate layer 11 is activated and the polar functional groups are increased, which promotes crosslinking reaction between the surface of the substrate layer 11 and reactive components in the adhesive layer 12. Accordingly, the effect of the adhesive layer 12 conforming to the substrate layer 11 is improved.

Moreover, additives such as a flame retardant, slip agent, anti-blocking agent, antioxidant, light stabilizer, tackifier and antistatic agent may be dispersed in the substrate layer 11 or applied on the surface of the substrate layer 11.

Examples of the slip agent include fatty acid amides (for example, oleic amide, erucic amide, stearic acid amide, behenic acid amide, ethylene bis-oleic acid amide and ethylene bis-erucic acid amide).

The anti-blocking agent preferably includes a variety of fillers such as silica.

The additive may be used singly or in combination of two or more.

The thickness of the substrate layer 11 is preferably in the range of 6 to 50 μm, and more preferably in the range of 10 to 40 μm, in view of puncture resistance, insulation, molding processability and the like. When the thickness of the substrate layer 11 is 6 μm or more, pinhole resistance and insulation is improved. Further, when the thickness of the substrate layer 11 is 50 μm or less, formability to thickness is improved.

The surface of the substrate layer 11 may have an irregularity in order to improve abrasion resistance, slippage and the like.

(Adhesive Layer 12)

The adhesive layer 12 is disposed between the substrate layer 11 and the metal foil layer 13. The adhesive layer 12 has adhesiveness required to closely adhere the substrate layer 11 and the metal foil layer 13. Further, the adhesive layer 12 has conformity to protect the metal foil layer 13 from being broken by the substrate layer 11 during mold processing.

The adhesive layer 12 may be formed by using a two-part curable adhesive composed of a base resin such as polyester polyol, polyether polyol, acryl polyol or the like and a hardener of bifunctional or higher functional aromatic or aliphatic isocyanate. Further, the equivalence ratio of the isocyanate group (NCO group) of the hardener to the hydroxyl group (OH group) of the base resin ([NCO]/[OH]) is preferably in the range between 1 and 50, and more preferably in the range between 3 and 40. When [NCO]/[OH] is 1 or more, good adhesiveness tends to be obtained. Further, when [NCO]/[OH] is more than 50, the adhesive layer 12 tends to be hard and brittle since the crosslinking reaction proceeds excessively. As a result, the adhesive layer 12 tends to be broken, and does not tend to conform to the substrate layer 11 and the metal foil layer 13.

A thermoplastic elastomer, tackifier, filler, pigment, dye and the like may be added to the adhesive layer 12.

The thickness of the adhesive layer 12 is preferably in the range of 0.3 to 3 μm, and more preferably in the range of 0.5 to 2 μm. When the thickness of the adhesive layer 12 is less than 0.3 μm, breakage may easily occur in the adhesive layer 12 due to fine cracks or pinholes in the adhesive layer 12. As a consequence, good conformity cannot be obtained during mold processing. On the other hand, when the thickness of the adhesive layer 12 is more than 3 μm, the substrate layer 11 fails to protect the metal foil layer 13 during mold processing, leading to decrease in formability.

The thickness of the adhesive layer 12 is not less than a 10-point average roughness Rzjis of the surface of the metal foil layer 13 which faces the substrate layer 11 and not more than 3 μm. However, the thickness is preferably not less than the 10-point average roughness Rzjis+0.5 μm and not more than 2.5 μm. When the thickness is less than the 10-point average roughness Rzjis of the surface of the metal foil layer 13 which faces the substrate layer 11, adhesive is filled into the recess of the irregular surface of the metal foil layer 13. As a consequence, the adhesive layer has thin portions at some points, which may affect conformity during mold processing. On the other hand, when the thickness is more than 3 μm, the substrate layer 11 may fail to protect the metal foil layer 13 during mold processing, leading to a decrease in formability.

The ratio of the thickness X of the substrate layer 11 to the thickness Y of the adhesive layer 12, X/Y, is preferably in the range between 4 and 50, and more preferably in the range between 6 and 30. When X/Y is 4 or more, the effect of the substrate layer 11 protecting the metal foil layer 13 can be readily obtained. On the other hand, when X/Y is more than 50, the protection effect may not be easily improved. Further, the increase in the film thickness of the substrate layer can cause a cost increase and an energy density decrease of the produced power storage device.

A peel strength between the substrate layer 11 and the metal foil layer 13 according to JIS K6854-3 is in the range of 5 to 12 N/15 mm, preferably in the range of 6 to 10 N/15 mm, and more preferably in the range of 7 to 8 N/15 mm. When the peel strength is less than 5 N/15 mm, the adhesive layer 12 may fail to conform to the substrate layer 11 and the metal foil layer 13 and may be peeled off during mold processing. Consequently, the protection effect of the substrate layer 11 cannot be obtained, leading to decrease in formability. On the other hand, when the peel strength is more than 12 N/15 mm, the adhesive layer 12 needs to be hardened to increase the peel strength. As a consequence, the adhesive layer 12 can have lowered conformity, leading to a decrease in formability. When the adhesive layer 12 is formed by using the aforementioned two-part curable adhesive, the peel strength may be increased by various ways such as using a base resin having high hydroxyl value, using a hardener with a high NCO content or a highly reactive hardener, increasing the equivalence ratio of the NCO group of the hardener to the OH group of the base resin ([NCO]/[OH]), increasing the number of functional groups of the surfaces of the substrate layer 11 and the metal foil layer 13 which face the adhesive layer 12, and aging under appropriate conditions after the metal foil layer 13 and the substrate layer 11 are adhered.

(Metal Foil Layer 13)

The metal foil layer 13 is disposed between the adhesive layer 12 and the adhesive resin layer 15. The metal foil layer 13 has water vapor barrier properties that prevents water from leaking into the power storage device. Further, the metal foil layer 13 has ductility for undergoing deep drawing.

The metal foil layer 13 may be made of aluminum, aluminum alloy, stainless steel, oxygen-free copper, tough pitch copper, phosphorous-deoxidized copper, brass, phosphor bronze, electrolytic copper, nickel, iron nickel alloy, or the like. Temper of the material during used can be selected depending on the elongation of each metal. Among those described above, the metal foil layer 13 is preferably made of an aluminum foil in view of weight (specific gravity), moisture resistance, processability, and cost. The aluminum foil may be a soft aluminum foil known in the art. Among others, an iron-containing aluminum foil is preferred in view of pinhole resistance and ductility during molding. The iron content of the aluminum foil (100 mass %) is preferably in the range of 0.1 to 9.0 mass % to 100 mass % of the total amount of the aluminum foil, and more preferably in the range of 0.5 to 2.0 mass %. When the iron content is not less than the lower limit, pinhole resistance and ductility are improved. When the iron content is not more than the upper limit, flexibility is improved.

The thickness of the metal foil layer 13 is preferably in the range of 20 to 80 μm, and more preferably in the range of 25 to 60 μm. When the thickness of the metal foil layer 13 is less than 20 μm, there is a risk of occurrence of pinholes or breakage. On the other hand, when the thickness is more than 80 µm, it causes cost increase and lowering of energy density, while the performance of the device may not be particularly improved.

The 10-point average roughness Rzjis (in accordance with JIS B0601) of a surface of the metal foil layer 13 which faces the substrate layer 11 is preferably in the range of 0.3 to 3 µm, and more preferably in the range of 1 to 2.5 µm. When the 10-point average roughness Rzjis is less than 0.3 µm, the adhesiveness to the adhesive layer 12 becomes insufficient, which may cause the substrate layer 11 to fail to protect the metal foil layer 13 during mold processing. On the other hand, when the 10-point average roughness Rzjis of the surface of the metal foil layer 13 is more than 3 µm, the adhesive is filled into the recess of the metal foil to thereby form thin adhesive portions, which may affect conformity during mold processing.

The surface of the metal foil layer 13 may be given various treatments to increase adhesiveness such as modification with fine metal particles.

(Anti-Corrosion Treatment Layer 14)

The anti-corrosion treatment layer 14 is formed on the surface of the metal foil layer 13 which faces the thermal bonding resin layer 16. The anti-corrosion layer 14, for example in a lithium ion power storage device, prevents corrosion of the surface of the metal foil layer 13 by hydrofluoric acid generated by reaction between an electrolyte and water. In addition to the anti-corrosion function, the anti-corrosion treatment layer 14 has a function as an anchor layer to the adhesive resin layer 15. The anti-corrosion treatment layer 14 can be formed by, for example, chromate treatment using an anti-corrosion treatment agent made of chromate, phosphate, fluoride and various thermosetting resins, ceria sol treatment using an anti-corrosion treatment agent made of oxide of rare earth element (for example, cerium oxide), phosphate and various thermosetting resins. The anti-corrosion treatment layer 14 is not limited to the layer formed by the above treatment as long as it can impart corrosion resistance to the metal foil layer 13. For example, the anti-corrosion treatment layer 14 may be formed by phosphate treatment, boehmite treatment or the like. Moreover, the anti-corrosion treatment layer 14 is not limited to a single layer, and may be configured as two or more layers, for example, by coating a resin as an over coating agent on the layer having an anti-corrosion function.

The thickness of the anti-corrosion layer 14 is preferably in the range of 5 nm to 1 µm, and more preferably in the range of 10 to 200 nm in view of anti-corrosion function and anchoring function.

Figure 4:
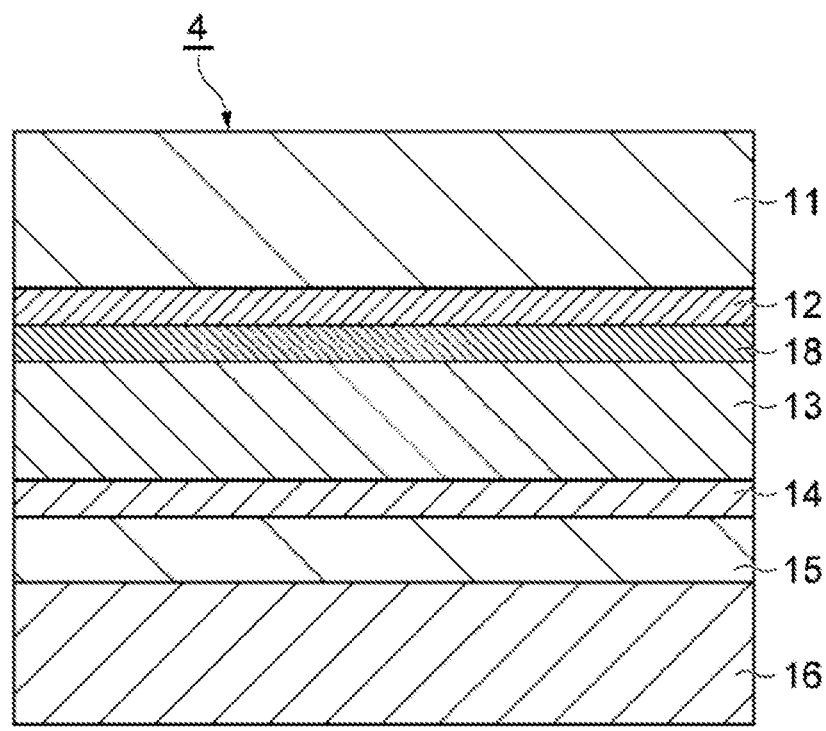
FIG. 4 is a cross-sectional view of a packaging material for a power storage device according to another embodiment of the present application.

The anti-corrosion treatment layer may be formed on the surface of the metal foil layer 13 which faces the substrate layer 11. That is, as shown in FIG. 4, a second anti-corrosion treatment layer 18 may be disposed between the metal foil layer 13 and the adhesive layer 12. By providing the second anti-corrosion treatment layer 18, the adhesive layer 12 has an improved conformity to the metal foil layer 13 since the second anti-corrosion treatment layer 18 serves as an anchoring layer in addition to preventing external corrosion of the metal foil layer 13. The second anti-corrosion treatment layer 18 may be formed by using an anti-corrosion treatment agent described in connection with the anti-corrosion treatment layer 14.

In addition to the adhesive layer 12, layers that can be disposed between the substrate layer 11 and the metal foil layer 13 include the second anti-corrosion treatment layer 18 described above, a layer that shares a function of the substrate layer 11 (for example, an anti-scratch layer that prevents occurrence of scratches during processing and distribution, and an insulation layer that prevents electrical contact between the metal foil layer 13 and an external member), and the like. In the present embodiment, in view of maintaining good formability, the thickness of the layers, including the above layers, disposed between the substrate layer and the metal foil layer is preferably in the range of 0.3 to 3 µm, and more preferably in the range of 0.5 to 2 µm. Further, as shown in FIG. 1, when only the adhesive layer 12 is disposed between the substrate layer 11 and the metal foil layer 13, the thickness of the layers disposed between the substrate layer 11 and the metal foil layer 13 refers to the thickness of the adhesive layer 12. In addition, as shown in FIG. 4, when the adhesive layer 12 and the second anti-corrosion treatment layer 18 are disposed between the substrate layer 11 and the metal foil layer 13, the thickness of the layers disposed between the substrate layer 11 and the metal foil layer 13 refers to the thickness of the adhesive layer 12 and the second anti-corrosion treatment layer 18.

(Adhesive Resin Layer 15)

The adhesive resin layer 15 is a layer that adheres the thermal bonding resin layer 16 and the metal foil layer 13. Methods for forming the adhesive resin layer 15 may be roughly divided into two methods, which are thermal lamination and dry lamination.

In the case of thermal lamination by which the adhesive resin layer 15 is formed by extrusion lamination, the components are preferably thermoplastic resins, including polyolefin resin, elastomer resin, and acid-modified polyolefin resin made of polyolefin resin modified with acid. Examples of the polyolefin resin include low density, medium density or high-density polyethylene; ethylene-α olefin copolymers; homo, block or random polypropylene; propylene-α olefin copolymers, and acid-modified products thereof. Examples of the acid-modified polyolefin include polyolefin modified with unsaturated carboxylic acids, acid anhydrides thereof, and derivatives thereof. Examples of unsaturated carboxylic acids and acid anhydrides thereof, and derivatives thereof include acrylic acid, methacrylic acid, maleic acid, fumaric acid, crotonic acid, itaconic acid, and acid anhydrides, mono- and diesters, amides, and imides thereof. Among these, acrylic acid, methacrylic acid, maleic acid, and maleic anhydride are preferably used, and maleic anhydride is more preferably used. Unsaturated carboxylic acids, acid anhydrides thereof, and derivatives thereof may be copolymerized to polyolefins in the form of block copolymerization, random copolymerization, graft copolymerization or the like. Unsaturated carboxylic acids, acid anhydrides thereof, and derivatives thereof may be used singly or in combination of two or more.

Polyolefin resins and acid-modified polyolefin resins have good electrolyte resistance. Further, elastomer resins include SEBS (polystyrene/polyethylene/polybutylene/polystyrene), SBS (polystyrene/polybutadiene/polystyrene), SEPS (polystyrene/polyethylene/polypropylene/polystyrene), SEP (polystyrene/polyethylene/polypropylene), SIS (polystyrene/polyisoprene/polystyrene) copolymers and the like. By adding these elastomer resins to the acid-modified polyolefin resin, properties such as resistance to stretch-whitening due to cracks during cold molding, adhesiveness due to improvement in wettability, film-forming properties due to anisotropy reduction, and heat bonding strength can also be improved.

On the other hand, in the case of dry lamination, the adhesive resin layer 15 can by formed by using a two-part curable adhesive or the like such as those described in connection with the adhesive layer 12.

For thermal lamination, the thickness of the adhesive resin layer 15 is preferably in the range of 8 to 30 μm, and more preferably in the range of 10 to 20 μm. When the thickness of the adhesive resin layer 15 is 8 μm or more, sufficient adhesive strength tends to be obtained. Further, when the thickness is 30 μm or less, the amount of water penetrating the power storage device through the seal edge tends to be decreased.

For dry lamination, the thickness of the adhesive resin layer 15 is preferably in the range of 1 to 5 μm. When the thickness of the adhesive resin layer 15 is less than 1 μm, adhesive strength tends to be low due to a decrease in adhesiveness. Further, when the thickness is more than 5 μm, film cracks may easily occur since the film is thick. The adhesive resin layer 15 having the thickness in the range of 1 to 5 μm can strongly adhere the thermal bonding resin layer 16 and the metal foil layer 13.

(Thermal Bonding Resin Layer 16)

The thermal bonding resin layer 16 is formed on the metal foil layer 13 with the adhesive resin layer 15 interposed therebetween. For example, two packaging materials can be thermally press-bonded to each other at a melting temperature of the thermal bonding resin layer 16 or higher with the thermal bonding resin layers 16 facing each other to thereby seal the contents in the packaging material. The thermal bonding resin layer 16 may be formed by using a polyolefin resin. Examples of the polyolefin resin include low density, medium density or high-density polyethylene, homo, block or random polypropylene, and the like. Further, resin having dispersion or copolymerization can be used, including copolymers obtained by copolymerizing the above compounds with a polar molecule such as acrylic acid or methacrylic acid, and polymers such as crosslinked polyolefins. Those polyolefin resins may be used singly or in combination of two or more. The thermal bonding resin layer 16 may also be formed by using a film in which various resins described above are blended. Further, the thermal bonding resin layer 16 may be a single layer film or a multi-layered film.

The thermal bonding resin layer 16 may contain various additives such as slip agents, anti-blocking agents, antistatic agents, nucleating agents, pigments, and dyes. These additives may be used singly or in combination of two or more. These additives may be contained in the thermal bonding resin layer 16, or may be applied on the surface of the thermal bonding resin layer 16 opposite to the metal foil layer 13. Further, the slip agent may be those described in connection with the substrate layer 11. By containing the slip agent in the thermal bonding resin layer 16 or applying the slip agent on the surface of the thermal bonding resin layer 16 as described above, the formability can be improved.

The thickness of the thermal bonding resin layer 16 is preferably in the range of 20 to 90 μm. When the thickness is less than 20 μm, sufficient lamination strength cannot be obtained. Further, when the thickness is more than 90 μm, the transmission amount of water vapor tends to increase.

[Producing Method of Packaging Material 1]

A method for producing the packaging material 1 will be described. The method for producing the packaging material includes, for example, the steps (1-1) to (1-3) described below. However, it is to be understood that this method is one example and that other methods may be used.

(1-1) Step of forming the anti-corrosion treatment layer 14 on one surface of the metal foil layer 13.

(1-2) Step of bonding the substrate layer 11 to the surface of the metal foil layer 13 on which the anti-corrosion treatment layer 14 is not formed with the adhesive layer 12 interposed therebetween by a dry lamination method to thereby produce a laminate (anti-corrosion treatment layer 14/metal foil layer 13/adhesive layer 12/substrate layer 11).

(1-3) Step of bonding the thermal bonding resin layer 16 to the surface of the metal foil layer 13 on which the anti-corrosion treatment layer 14 is formed with the adhesive resin layer 15 interposed therebetween to thereby produce a packaging material 1 (thermal bonding resin layer 16/adhesive resin layer 15/anti-corrosion treatment layer 14/metal foil layer 13/adhesive layer 12/substrate layer 11).

Step (1-1)

An anti-corrosion treatment agent is applied on one surface of the metal foil layer 13 and baked to form the anti-corrosion treatment layer 14. Here, the anti-corrosion treatment can be performed not only on one surface, but also on both surfaces, and the second anti-corrosion treatment layer 18 may be further formed. The method for applying the anti-corrosion treatment agent is not specifically limited, and may be, for example, gravure coating, gravure reverse coating, roll coating, reverse coating, die coating, bar coating, kiss coating, or comma coating.

Step (1-2)

The substrate layer 11 is bonded to the surface of the metal foil layer 13 on which the anti-corrosion treatment layer 14 is not formed (or on the surface on which the second anti-corrosion treatment layer 18 is formed) with the adhesive layer 12 interposed therebetween by a dry lamination method to thereby produce a laminate (anti-corrosion treatment layer 14/metal foil layer 13/adhesive layer 12/substrate layer 11). The method for applying the adhesive layer 12 is not specifically limited, and may be, for example, gravure coating, gravure reverse coating, roll coating, reverse roll coating, die coating, bar coating, kiss coating, or comma coating. In step (1-2), for promoting a curing reaction or stabilizing crystallization, an aging treatment is preferably applied at a temperature in the range of 20 to 100° C. At the temperature less than 20° C., the curing reaction is not sufficiently promoted. At the temperature more than 100° C., the substrate layer 11 is deteriorated, leading to decrease in formability.

Step (1-3)

The methods for forming the adhesive resin layer 15 are roughly divided into methods using thermal lamination and methods using dry lamination.

In the case of adopting the thermal lamination, a dry process or a wet process can be selected.

When a dry process is used, an adhesive resin is laminated by extrusion on the metal foil layer 13 of the laminate (the surface on which the anti-corrosion treatment layer 14 is formed). Then, a film is further laminated to form the thermal bonding resin layer 16 obtained by blown film extrusion or T die extrusion. Subsequently, a thermal treatment (aging treatment, thermal lamination, or the like) may be performed in order to improve adhesiveness between the metal foil layer 13 and the thermal bonding resin layer 16. Alternatively, a multi-layered film in which the adhesive resin layer 15 and the thermal bonding resin layer 16 are laminated may be formed by an inflation process or T die extrusion, and the multi-layered film may be laminated on the laminate by thermal lamination to thereby laminate the thermal bonding resin layer 16 on the metal foil layer 13 with the adhesive resin layer 15 interposed therebetween.

When a wet process is used, an adhesive resin solution of dispersion type of an adhesive resin such as an acid-modified polyolefin resin is applied on the metal foil layer 13 of the laminate (on the surface on which the anti-corrosion treatment layer 14 is formed). The solvent is volatilized at a temperature at a melting point or higher of the adhesive resin to melt and soften the adhesive resin for baking. Then, the thermal bonding resin layer 16 is laminated by a thermal process such as thermal lamination.

In the case of adopting the dry lamination, the adhesive resin layer 15 is applied on the metal foil layer 13 of the laminate (on the surface on which the anti-corrosion treatment layer 14 is formed), and heated by an oven to dry the solvent. Subsequently, the thermal bonding resin layer 16 is bonded by thermocompression to thereby produce the packaging material 1. The method for applying the adhesive resin layer 15 is not specifically limited, and may be, for example, gravure coating, gravure reverse coating, roll coating, reverse coating, die coating, bar coating, kiss coating, or comma coating.

In step (1-3), for promoting curing reaction or stabilizing crystallization, an aging treatment is preferably applied at a temperature in the range of 20 to 100° C. At a temperature less than 20° C., the curing reaction is not sufficiently promoted. At a temperature more than 100° C., the substrate layer 11 is deteriorated, leading to a decrease in formability.

The packaging material 1 is obtained by the above steps (1-1) to (1-3). The method for producing the packaging material 1 is not limited to the method that performs the steps (1-1) to (1-3) in sequence. For example, step (1-3) may be performed before step (1-2).

[Producing Method of Power Storage Device]

The power storage device according to the present embodiment is a power storage device including a power storage device element which includes a positive electrode and a negative electrode; a metal terminal connected to each of the positive electrode and the negative electrode; and a packaging material having a molded section that accommodates the power storage device element, wherein the packaging material is folded over with the thermal bonding resin layer facing inward and end portions of the packaging material are thermally press-bonded to seal the power storage device element and hold the metal terminal to be partially exposed outside.

More specifically, as shown in FIG. 2A-FIG. 2D, the power storage device 2 of the present embodiment has a configuration in which the power storage device element 21 is accommodated in the packaging material 1, and tabs 25 each made up of a lead 23 and a tab sealant 24 connected to each of the positive electrode and the negative electrode of the power storage device element 21 are gripped by a thermally press-bonded section 26.

A method for manufacturing the power storage device 2 will be described with reference to FIG. 2A-FIG. 2D. The method for producing the power storage device 2 includes, for example, steps (2-1) to (2-4) described below.

Figure 2A:
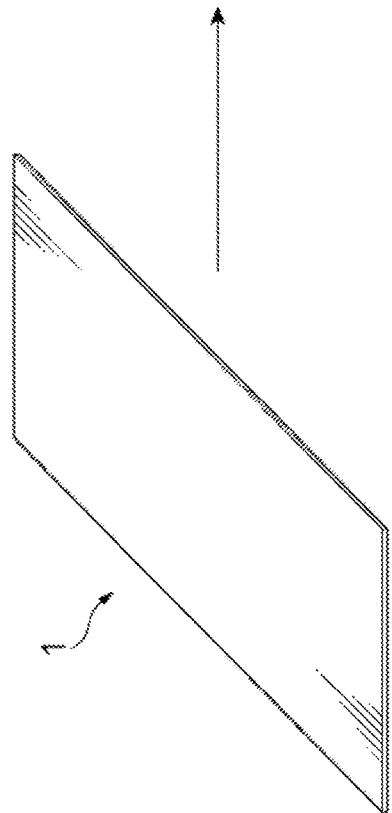
FIGS. 2A-2D are a process diagram of a method for producing a power storage device according to a first embodiment of the present invention.
Figure 2B:
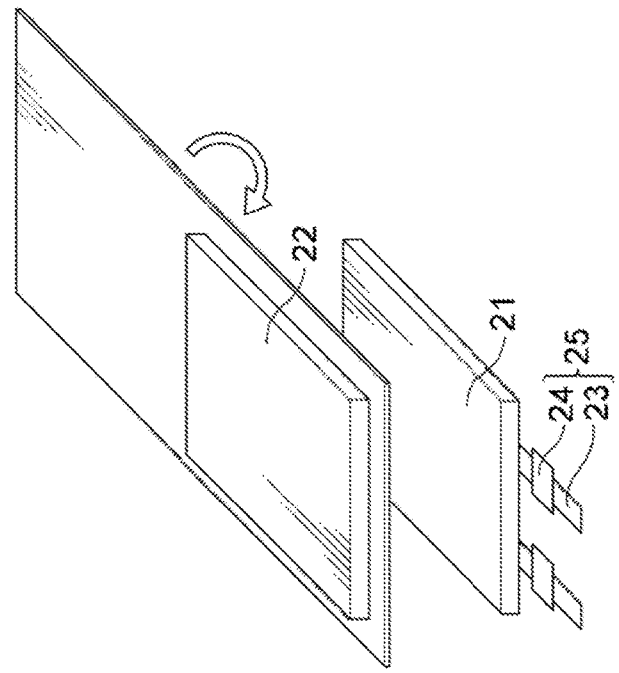

(2-1) Step of forming a molded section 22 in a half portion of the packaging material 1 so that the power storage device element 21 is placed therein (see FIG. 2A and FIG. 2B).

Figure 2C:
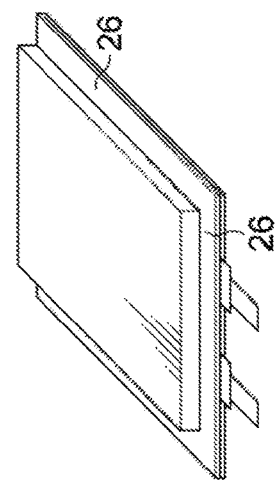

(2-2) Step of placing the power storage device element 21 in the molded section 22 of the packaging material 1, folding the other half portion of the packaging material 1 with the thermal bonding resin layer facing inward so that the corresponding three sides of the half portions are overlapped with each other, and thermally press-bonding only one side that grips the tabs 25 each made up of the lead 23 and the tab sealant 24 (see FIGS. 2B and 2C).

(2-3) Step of thermally press-bonding one of the remaining two sides, introducing an electrolyte solution through the other of the two sides, and then thermally press-bonding the other side under the vacuum state (see FIG. 2C).

Figure 2D:
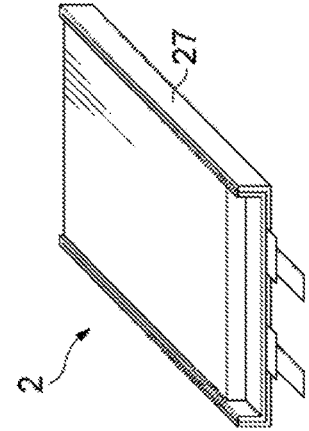

(2-4) Step of cutting off the end portions of the thermally press-bonded section 26 except for the side that grips the tabs 25, and folding the thermally press-bonded section 26 along the molded section 22 (see FIG. 2D).

Step (2-1)

The packaging material 1 is formed by using a mold to have a desired depth into the thermal bonding resin layer 16. A mold composed of a male mold and a female mold having a gap greater than the total thickness of the packaging material 1 is used to perform deep drawing from the thermal bonding resin layer 16 toward the substrate layer 11 to thereby obtain the packaging material 1 having a desired deep drawing depth. With use of the adhesive layer 12 having higher conformity and the packaging material 1 having higher formability, a deeper depth can be formed. Accordingly, the power storage device 2 that can accommodate more power storage device elements 21 and have high energy density can be obtained. In the present embodiment, the molded section 22 having the molding depth of 6 mm or more can efficiently accommodate the power storage device element 21 to increase the energy density. From this point of view, the molding depth is preferably 8 mm or more. Further, in order to prevent the metal foil layer 13 from being too thin due to mold processing, the upper limit of the molding depth can be approximately 12 mm.

Step (2-2)

The power storage device element 21 composed of the positive electrode, separator, negative electrode, and the like is placed in the molded section 22 of the packaging material 1, and the tabs 25 each connected to the positive and negative electrodes are led out from the molded section 22. Then, the thermal bonding resin layers 16 of the packaging material 1 are overlapped each other, and the side of the packaging material 1 that grips the tab 25 is thermally press-bonded. The thermal press-bonding can be controlled by three conditions, i.e., temperature, pressure, and time to ensure melting at a melting temperature of the thermal bonding resin layer 16 or higher and appropriate pressure conditions.

Step (2-3)

Then, thermal press-bonding is further performed on the side that does not grip the tabs 25 while one side is left open. Subsequently, an electrolyte solution in which electrolyte is dissolved is introduced through the open side. After a degassing step in the aging process, final thermal press-bonding is performed under the vacuum state to prevent air intrusion.

Step (2-4)

The end portion of the thermally press-bonded section except for the side that grips the lead 23 is cut off to remove the thermal bonding resin layer 16 extending over the end portion. Subsequently, the thermally press-bonded section 26 is folded over along the molded section 22 to thereby form a folded section 27. Thus, the power storage device 2 can be obtained.

The power storage device 2 is obtained by steps (2-1) to (2-4) described above.

However, the producing method of the power storage device 2 is not limited to the aforementioned method. For example, step (2-4) can be omitted.

While the embodiment of the present invention is described in detail with reference to the drawings, the specific configuration is not limited to the above embodiment. Design modifications and the like may be contemplated without departing from the principle of the present invention.

EXAMPLES

The details of the present invention will be described below by way of Examples, but the present invention is not limited by the following description.

[Materials for Use]
Materials used for the present Examples are shown below.
(Substrate Layer 11)
Substrate A-1: Polyester film (thickness 9 μm).
Substrate A-2: Polyester film (thickness 12 μm).
Substrate A-3: Polyester film (thickness 15 μm).
Substrate A-4: Polyester film (thickness 25 μm).
Substrate A-5: Polyamide film (thickness 12 μm).
Substrate A-6: Polyamide film (thickness 15 μm).
Substrate A-7: Polyamide film (thickness 25 μm).
Substrate A-8: Polyester film (thickness 12 μm). A corona treatment is applied on the surface facing the adhesive layer.
Substrate A-9: Polyester film (thickness 12 μm). A frame treatment is applied on the surface facing the adhesive layer.
Substrate A-10: Polyester film (thickness 12 μm). A primer treatment is applied on the surface facing the adhesive layer.
Substrate A-11: A laminate film made of polyamide film (thickness 12 μm)/second adhesive layer (thickness 0.3 μm)/polyester film (thickness 12 μm). The polyamide film is bonded to the adhesive layer. An adhesive B-6 is used for the second adhesive layer.
Substrate A-12: A laminate film made of polyamide film (thickness 12 μm)/second adhesive layer (thickness 3 μm)/polyester film (thickness 12 μm). The polyamide film is bonded to the adhesive layer. An adhesive B-6 is used for the second adhesive layer.
Substrate A-13: A laminate film made of polyamide film (thickness 12 μm)/second adhesive layer (thickness 5 μm)/polyester film (thickness 12 μm). The polyamide film is bonded to the adhesive layer. An adhesive B-6 is used for the second adhesive layer.
(Adhesive Layer 12)
Adhesive B-1: Two-part curable polyester urethane adhesive (two-part curable adhesive made of polyester polyol and polyisocyanate. [NCO]/[OH]=0.5)
Adhesive B-2: Two-part curable polyester urethane adhesive (two-part curable adhesive made of polyester polyol and polyisocyanate. [NCO]/[OH]=1)
Adhesive B-3: Two-part curable polyester urethane adhesive (two-part curable adhesive made of polyester polyol and polyisocyanate. [NCO]/[OH]=3)
Adhesive B-4: Two-part curable polyester urethane adhesive (two-part curable adhesive made of polyester polyol and polyisocyanate. [NCO]/[OH]=10)
Adhesive B-5: Two-part curable polyester urethane adhesive (two-part curable adhesive made of polyester polyol and polyisocyanate. [NCO]/[OH]=20)
Adhesive B-6: Two-part curable polyester urethane adhesive (two-part curable adhesive made of polyester polyol and polyisocyanate. [NCO]/[OH]=40)
Adhesive B-7: Two-part curable polyester urethane adhesive (two-part curable adhesive made of polyester polyol and polyisocyanate. [NCO]/[OH]=50)
Adhesive B-8: Two-part curable polyester urethane adhesive (two-part curable adhesive made of polyester polyol and polyisocyanate. [NCO]/[OH]=70)
Adhesive B-9: Two-part curable polyether urethane adhesive (two-part curable adhesive made of polyether polyol and polyisocyanate. [NCO]/[OH]=20)
Adhesive B-10: Two-part curable acryl polyurethane adhesive (two-part curable adhesive made of acryl polyol and polyisocyanate. [NCO]/[OH]=20)
(Second Anti-Corrosion Treatment Layer 18)
Treatment agent C-1: Treatment layer made of chromate (layer thickness 100 nm).
Treatment agent C-2: Treatment layer made of cerium oxide (layer thickness 100 nm).
(Metal Foil Layer 13)
Metal Foil D-1: Aluminum foil 8021 (thickness 40 μm, 10-point average roughness Rzjis on the surface facing the substrate layer is 0.3 μm)
Metal foil D-2: Aluminum foil 8079 (thickness 40 μm, 10-point average roughness Rzjis on the surface facing the substrate layer is 0.6 μm)
Metal foil D-3: Stainless foil 304 (thickness 40 μm, 10-point average roughness Rzjis on the surface facing the substrate layer is 0.7 μm)
Metal foil D-4: Tough pitch copper foil C1100 (thickness 40 μm, 10-point average roughness Rzjis on the surface facing the substrate layer is 1.1 μm)
Metal foil D-5: Electrolyte copper foil (thickness 40 μm, 10-point average roughness Rzjis on the surface facing the substrate layer is 2.5 μm)
Metal foil D-6: Electrolyte copper foil (thickness 40 μm, 10-point average roughness Rzjis on the surface facing the substrate layer is 8.0 μm)
Metal foil D-7: Surface polished aluminum foil 8021 (thickness 40 μm, 10-point average roughness Rzjis on the surface facing the substrate layer is 0.2 μm)
(Anti-Corrosion Treatment Layer 14)
Treatment agent E-1: Treatment layer made of cerium oxide (layer thickness 100 nm).
(Adhesive Resin Layer 15)
Adhesive resin F-1: Polypropylene resin modified with maleic anhydride (layer thickness 20 μm)
(Thermal Bonding Resin Layer 16)
Thermal bonding resin G-1: Polypropylene film (layer thickness 40 μm)
(Production of Packaging Material)
The anti-corrosion treatment layer E-1 was formed on one surface of the metal foils D-1 to D-7 by direct gravure coating. In Examples 24 and 25, the anti-corrosion treatment layer C-1 or C-2 was formed on the other surface of the metal foil D-1, on which the anti-corrosion treatment layer E-1 was not formed, by direct gravure coating. Then, one of the adhesives B-1 to B-10 was applied on the surface of the metal foils D-1 to D-7 on which the anti-corrosion treatment layer E-1 was not formed, and one of the substrates A-1 to A-13 was applied thereon by dry lamination. Subsequently, aging was performed at a temperature of 40° C. for seven days except for Comparative Example 6. Then, the adhesive resin F-1 was extruded on the anti-corrosion treatment layer E-1 of the obtained laminate by using an extrusion machine to form an adhesive layer. The film G-1 was then laminated on the adhesive layer by sandwich lamination to thereby form a sealant layer. Through the aforementioned steps, the packaging material of Examples and Comparative Examples was produced.

[Evaluations]
Evaluations were conducted according to the following methods. Tables 1 and 2 show the evaluation results.

[Evaluation of Peel Strength]
The packaging materials produced by the examples were cut off into a size of 15 mm×100 mm, the peel strength between the substrate layer and the metal foil layer with 15 mm width in accordance with JIS K6854-3 was measured. If the substrate layer was broken during evaluation of the peel strength, the strength at the breakage was determined as the peel strength.

[Evaluation of Formability]
The packaging material obtained in each of the examples was cut into a blank of 150 mm×190 mm, and cold-molded while changing the molding depth in the environment with room temperature 23° C. and dew point temperature −35° C. to evaluate the formability. A punch having dimensions 100 mm×150 mm, a punch corner R (RCP) 1.5 mm, a punch shoulder R (RP) 0.75 mm and a die shoulder R (RD) 0.75 mm was used. Evaluation was carried out based on the following criteria, and the evaluation D was judged as failure.

A: Deep drawing to a molding depth of 6 mm or more was possible without causing breakage or cracking.

B: Deep drawing to a molding depth of 4 mm or more and less than 6 mm was possible without causing breakage or cracking.

C: Deep drawing to a molding depth of 3 mm or more and less than 4 mm was possible without causing breakage or cracking.

D: Breakage or cracking occurred in deep drawing to a molding depth of less than 3 mm.

[Evaluation of Peeling During Molding]

In evaluation of formability, whether peeling occurs between the substrate layer and the metal foil layer was evaluated. Evaluation was carried out based on the following criteria, and the evaluation B was judged as failure.

A: In evaluation of formability, peeling does not occur between the substrate layer and the metal foil layer.

B: In evaluation of formability, peeling occurs between the substrate layer and the metal foil layer.

TABLE 1

| Example | Substrate layer | Adhesive layer | Metal foil layer | Second anti-corrosion treatment layer | Metal foil layer Rzjis (μm) | Substrate layer thickness X (μm) | Adhesive layer thickness Y (μm) | X/Y | [NCO]/[OH] |
|---|---|---|---|---|---|---|---|---|---|
| Example 1 | A-2 | B-5 | D-1 | — | 0.3 | 12 | 0.3 | 40 | 20 |
| Example 2 | A-3 | B-5 | D-1 | — | 0.3 | 15 | 0.3 | 50 | 20 |
| Example 3 | A-4 | B-5 | D-1 | — | 0.3 | 25 | 0.3 | 83.3 | 20 |
| Example 4 | A-2 | B-5 | D-2 | — | 0.6 | 12 | 0.5 | 24 | 20 |
| Example 5 | A-3 | B-5 | D-3 | — | 0.7 | 15 | 0.5 | 30 | 20 |
| Example 6 | A-1 | B-5 | D-2 | — | 0.6 | 9 | 1 | 9 | 20 |
| Example 7 | A-2 | B-5 | D-2 | — | 0.6 | 12 | 1 | 12 | 20 |
| Example 8 | A-3 | B-5 | D-2 | — | 0.6 | 15 | 1 | 15 | 20 |
| Example 9 | A-1 | B-5 | D-2 | — | 0.6 | 9 | 2 | 4.5 | 20 |
| Example 10 | A-2 | B-5 | D-2 | — | 0.6 | 12 | 2 | 6 | 20 |
| Example 11 | A-3 | B-5 | D-2 | — | 0.6 | 15 | 2 | 7.5 | 20 |
| Example 12 | A-1 | B-5 | D-2 | — | 0.6 | 9 | 3 | 3 | 20 |
| Example 13 | A-2 | B-5 | D-2 | — | 0.6 | 12 | 3 | 4 | 20 |
| Example 14 | A-3 | B-5 | D-2 | — | 0.6 | 15 | 3 | 5 | 20 |
| Example 15 | A-2 | B-1 | D-2 | — | 0.6 | 12 | 1 | 12 | 0.5 |
| Example 16 | A-2 | B-2 | D-2 | — | 0.6 | 12 | 1 | 12 | 1 |
| Example 17 | A-2 | B-3 | D-2 | — | 0.6 | 12 | 1 | 12 | 3 |
| Example 18 | A-2 | B-4 | D-2 | — | 0.6 | 12 | 1 | 12 | 10 |
| Example 19 | A-2 | B-6 | D-2 | — | 0.6 | 12 | 1 | 12 | 40 |
| Example 20 | A-2 | B-7 | D-2 | — | 0.6 | 12 | 1 | 12 | 50 |
| Example 21 | A-2 | B-8 | D-2 | — | 0.6 | 12 | 1 | 12 | 70 |
| Example 22 | A-2 | B-9 | D-2 | — | 0.6 | 12 | 1 | 12 | 20 |
| Example 23 | A-2 | B-10 | D-2 | — | 0.6 | 12 | 1 | 12 | 20 |
| Example 24 | A-2 | B-5 | D-1 | C-1 | 0.3 | 12 | 0.3 | 40 | 20 |
| Example 25 | A-2 | B-5 | D-1 | C-2 | 0.3 | 12 | 0.3 | 40 | 20 |
| Example 26 | A-8 | B-5 | D-1 | — | 0.3 | 12 | 0.3 | 40 | 20 |
| Example 27 | A-9 | B-5 | D-1 | — | 0.3 | 12 | 0.3 | 40 | 20 |
| Example 28 | A-10 | B-5 | D-1 | — | 0.3 | 12 | 0.3 | 40 | 20 |
| Example 29 | A-5 | B-5 | D-1 | — | 0.3 | 12 | 0.3 | 40 | 20 |
| Example 30 | A-6 | B-5 | D-1 | — | 0.3 | 15 | 0.3 | 50 | 20 |
| Example 31 | A-7 | B-5 | D-1 | — | 0.3 | 25 | 0.3 | 83.3 | 20 |
| Example 32 | A-5 | B-5 | D-1 | — | 0.3 | 12 | 0.5 | 24 | 20 |
| Example 33 | A-6 | B-5 | D-1 | — | 0.3 | 15 | 0.5 | 30 | 20 |
| Example 34 | A-5 | B-5 | D-2 | — | 0.6 | 12 | 1 | 12 | 20 |
| Example 35 | A-6 | B-5 | D-2 | — | 0.6 | 15 | 1 | 15 | 20 |
| Example 36 | A-5 | B-5 | D-2 | — | 0.6 | 12 | 2 | 6 | 20 |
| Example 37 | A-6 | B-5 | D-2 | — | 0.6 | 15 | 2 | 7.5 | 20 |
| Example 38 | A-5 | B-5 | D-2 | — | 0.6 | 12 | 3 | 4 | 20 |
| Example 39 | A-6 | B-5 | D-2 | — | 0.6 | 15 | 3 | 5 | 20 |
| Example 40 | A-11 | B-5 | D-1 | — | 0.3 | 24.3 | 0.5 | 48.6 | 20 |
| Example 41 | A-12 | B-5 | D-1 | — | 0.3 | 27 | 0.5 | 54.0 | 20 |
| Example 42 | A-13 | B-5 | D-1 | — | 0.3 | 29 | 0.5 | 58.0 | 20 |
| Example 43 | A-2 | B-5 | D-3 | — | 0.7 | 12 | 1 | 12 | 20 |
| Example 44 | A-2 | B-5 | D-3 | — | 0.7 | 12 | 2 | 6 | 20 |

TABLE 1-continued

| Example | Substrate layer | Adhesive layer | Metal foil layer | Second anti-corrosion treatment layer | Metal foil layer Rzjis (μm) | Substrate layer thickness X (μm) | Adhesive layer thickness Y (μm) | X/Y | [NCO]/[OH] |
|---|---|---|---|---|---|---|---|---|---|
| Example 45 | A-2 | B-5 | D-4 | — | 1.1 | 12 | 1.5 | 8 | 20 |
| Example 46 | A-2 | B-5 | D-5 | — | 2.5 | 12 | 3 | 4 | 20 |
| Comparative Example 1 | A-2 | B-5 | D-2 | — | 0.6 | 12 | 0.2 | 60 | 20 |
| Comparative Example 2 | A-3 | B-5 | D-2 | — | 0.6 | 15 | 0.2 | 75 | 20 |
| Comparative Example 3 | A-2 | B-5 | D-2 | — | 0.6 | 12 | 5 | 2.4 | 20 |
| Comparative Example 4 | A-3 | B-5 | D-2 | — | 0.6 | 15 | 5 | 3 | 20 |
| Comparative Example 5 | A-4 | B-5 | D-2 | — | 0.6 | 25 | 10 | 2.5 | 20 |
| Comparative Example 6 | A-2 | B-5 | D-7 | — | 0.2 | 12 | 1 | 12 | 20 |
| Comparative Example 7 | A-2 | B-5 | D-6 | — | 8.0 | 12 | 8 | 1.5 | 20 |
| Comparative Example 8 | A-2 | B-5 | D-6 | — | 8.0 | 12 | 10 | 1.2 | 20 |
| Comparative Example 9 | A-5 | B-5 | D-2 | — | 0.6 | 12 | 0.2 | 60 | 20 |
| Comparative Example 10 | A-6 | B-5 | D-2 | — | 0.6 | 15 | 0.2 | 75 | 20 |
| Comparative Example 11 | A-5 | B-5 | D-2 | — | 0.6 | 12 | 5 | 2.4 | 20 |
| Comparative Example 12 | A-6 | B-5 | D-2 | — | 0.6 | 15 | 5 | 3 | 20 |
| Comparative Example 13 | A-7 | B-5 | D-2 | — | 0.6 | 25 | 10 | 2.5 | 20 |

TABLE 2

| Example | Peel strength (N/15 mm) | Formability | Peeling during molding |
|---|---|---|---|
| Example 1 | 5.6 | B | A |
| Example 2 | 5.8 | B | A |
| Example 3 | 5.2 | B | A |
| Example 4 | 6.2 | A | A |
| Example 5 | 6.5 | A | A |
| Example 6 | 7.2 | A | A |
| Example 7 | 7.3 | A | A |
| Example 8 | 7.3 | A | A |
| Example 9 | 7.8 | B | A |
| Example 10 | 7.7 | A | A |
| Example 11 | 7.8 | A | A |
| Example 12 | 8.2 | C | A |
| Example 13 | 8.3 | B | A |
| Example 14 | 8.2 | B | A |
| Example 15 | 5.5 | C | A |
| Example 16 | 6.4 | B | A |
| Example 17 | 7.1 | A | A |
| Example 18 | 7.4 | A | A |
| Example 19 | 7.9 | A | A |
| Example 20 | 9.4 | B | A |
| Example 21 | 11.8 | C | A |
| Example 22 | 7.2 | A | A |
| Example 23 | 7.3 | A | A |
| Example 24 | 6.5 | A | A |
| Example 25 | 6.4 | A | A |
| Example 26 | 7.1 | A | A |
| Example 27 | 7.2 | A | A |
| Example 28 | 7.5 | A | A |
| Example 29 | 5.4 | B | A |
| Example 30 | 5.1 | B | A |
| Example 31 | 5.4 | B | A |
| Example 32 | 6.4 | A | A |
| Example 33 | 6.3 | A | A |
| Example 34 | 7.4 | A | A |
| Example 35 | 7.4 | A | A |
| Example 36 | 7.6 | A | A |
| Example 37 | 7.5 | A | A |
| Example 38 | 8.1 | B | A |
| Example 39 | 8.2 | B | A |
| Example 40 | 6.6 | A | A |
| Example 41 | 6.6 | A | A |
| Example 42 | 6.7 | B | A |
| Example 43 | 7.5 | B | A |
| Example 44 | 7.9 | A | A |
| Example 45 | 7.8 | A | A |
| Example 46 | 8.2 | A | A |
| Comparative Example 1 | 4.3 | D | B |
| Comparative Example 2 | 4.1 | D | B |
| Comparative Example 3 | 10.3 | D | A |
| Comparative Example 4 | 10.1 | D | A |
| Comparative Example 5 | 12.8 | D | A |
| Comparative Example 6 | 3.2 | D | B |
| Comparative Example 7 | 4.6 | D | B |
| Comparative Example 8 | 12.9 | D | A |
| Comparative Example 9 | 4.3 | D | B |
| Comparative Example 10 | 4.5 | D | B |
| Comparative Example 11 | 10.8 | D | A |
| Comparative Example 12 | 10.9 | D | A |
| Comparative Example 13 | 12.4 | D | A |

As shown in tables 1 and 2, in this Example, the substrate layer was not peeled during mold processing, and the adhesive layer had sufficient conformity. That is, since the packaging material for a power storage device of the present Example has a sufficient formability, it seems that the packaging material can prevent a decrease in protection effect of the substrate layer.

On the other hand, none of the Comparative Examples exhibited sufficient formability. For example, in Comparative Examples 1, 2, 9, and 10, the adhesive layer had a small thickness and sufficient conformity during mold processing was not obtained, and thus sufficient formability was not obtained. In Comparative Examples 3 to 5 and 11 to 13, the adhesive layer had a large thickness, and the substrate layer failed to prevent pinholes and breakage of the metal foil layer, leading to decrease in formability. Further, in Comparative Examples 6 to 8, in which the peel strength was too low or too high, sufficient formability was not obtained. Further, in Comparative Example 6, the roughness on the surface of the metal foil layer was small, and the adhesiveness was insufficient. As a result, sufficient formability was not obtained. In Comparative Examples 7 and 8, the roughness on the surface of the metal foil layer was large, and the adhesive layer was embedded. As a result, sufficient formability was not obtained.

REFERENCE SIGNS LIST 1, 3, 4 . . . Packaging material; 2 . . . Power storage device; 11 . . . Substrate layer; 11A, 11B . . . Substrate film; 12 . . . Adhesive layer; 13 . . . Metal foil layer; 14 . . . Anti-corrosion treatment layer; 15 . . . Adhesive resin layer; 16 . . . Thermal bonding resin layer; 17 . . . Second adhesive layer; 18 . . . Second anti-corrosion treatment layer; 21 . . . Power storage device element; 22 . . . Molded section; 23 . . . Lead; 24 . . . Tab sealant; 25 . . . Tab; 26 . . . Thermally press-bonded section; 27 . . . Folded section

What is claimed is:

1. A packaging material for a power storage device, the packaging material comprising at least a substrate layer, an adhesive layer, a metal foil layer, an anti-corrosion treatment layer, an adhesive resin layer and a thermal bonding resin layer laminated in this order, wherein
    a thickness of the adhesive layer is in a range of 0.3 to 3 μm,
    a 10-point average roughness Rzjis in accordance with JIS B0601 of a surface of the metal foil layer which faces the substrate layer is in a range of 0.3 to 3 and the thickness of the adhesive layer is not less than the 10-point average roughness Rzjis and not more than 3 μm, and
    a peel strength between the substrate layer and the metal foil layer in accordance with JIS K6854-3 is in a range of 5 to 12 N/15 mm.

2. The packaging material for a power storage device of claim 1, wherein a ratio of a thickness X of the substrate layer to a thickness Y of the adhesive layer, X/Y, is in a range between 4 and 50.

3. The packaging material for a power storage device of claim 1, wherein the adhesive layer is made of a two-part curable urethane-based adhesive in which a base resin including polyol is configured to react with a hardener including bifunctional or higher functional aromatic or aliphatic isocyanate, and an equivalence ratio of an isocyanate group of the hardener to a hydroxyl group of the base resin ([NCO]/[OH]) is in a range between 1 and 50.

4. The packaging material for a power storage device of claim 1, wherein the substrate layer includes at least one of a polyamide film and a polyester film.

5. The packaging material for a power storage device of claim 4, wherein
    the substrate layer includes the polyamide film and the polyester film laminated via a second adhesive layer, and
    the second adhesive layer is made of the same adhesive as the adhesive layer, and the thickness of the second adhesive layer is in a range of 0.3 to 3 μm.

6. The packaging material for a power storage device of claim 1, further comprising a second anti-corrosion treatment layer that is further disposed between the adhesive layer and the metal foil layer.

7. The packaging material for a power storage device of claim 1, further comprising a corona treatment, frame treatment, primer treatment or ultraviolet radiation treatment being applied on a surface of the substrate layer which faces the metal foil layer.

8. A power storage device comprising:
    a power storage device element that includes a positive electrode and a negative electrode;
    a metal terminal connected to each of the positive electrode and the negative electrode; and
    a packaging material having a molded section with a depth of 6 mm or more that accommodates the power storage device element, wherein
    the packaging material is the packaging material for a power storage device according to claim 1, and
    wherein the packaging material is folded over with the thermal bonding resin layer facing inward and end portions of the packaging material are thermally press-bonded to seal the power storage device element and hold the metal terminal to be partially exposed outside.

* * * * *